(12) United States Patent
Takahara et al.

(10) Patent No.: US 12,021,406 B2
(45) Date of Patent: Jun. 25, 2024

(54) BATTERY CONTROL DEVICE, VEHICLE, BATTERY CONTROL METHOD AND NON-TRANSITORY COMPUTER-READABLE RECORDING MEDIUM

(71) Applicant: TOYOTA JIDOSHA KABUSHIKI KAISHA, Toyota (JP)

(72) Inventors: Yoshiyuki Takahara, Toyota (JP); Norio Nishiwaki, Tajimi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 360 days.

(21) Appl. No.: 17/568,007

(22) Filed: Jan. 4, 2022

(65) Prior Publication Data

US 2022/0263334 A1 Aug. 18, 2022

(30) Foreign Application Priority Data

Feb. 16, 2021 (JP) ................. 2021-022782

(51) Int. Cl.
*H02J 7/00* (2006.01)
*B60W 10/30* (2006.01)
*B60W 60/00* (2020.01)

(52) U.S. Cl.
CPC ....... *H02J 7/007194* (2020.01); *B60W 10/30* (2013.01); *B60W 60/001* (2020.02); *H02J 7/0013* (2013.01); *H02J 7/0048* (2020.01); *H02J 7/0063* (2013.01); *B60W 2510/244* (2013.01); *B60W 2510/246* (2013.01); *B60W 2555/20* (2020.02)

(58) Field of Classification Search
CPC .. H02J 7/007194; H02J 7/0048; H02J 7/0013; H02J 7/0063; B60W 60/001; B60W 10/30
USPC .......................................... 701/23
See application file for complete search history.

(56) References Cited

U.S. PATENT DOCUMENTS

| | | | |
|---|---|---|---|
| 8,471,521 B2 * | 6/2013 | Stewart | B60L 53/14 320/132 |
| 2017/0274888 A1 * | 9/2017 | Suzuki | B60K 6/445 |
| 2020/0298888 A1 * | 9/2020 | Ozeki | H01M 10/46 |

FOREIGN PATENT DOCUMENTS

JP 2020-156228 A 9/2020

* cited by examiner

*Primary Examiner* — Peter D Nolan
*Assistant Examiner* — Luke Huynh
(74) *Attorney, Agent, or Firm* — Oblon, McClelland, Maier & Neustadt, L.L.P.

(57) ABSTRACT

A battery control device that: computes a potential power output capable of being output by a second battery capable of supplying power to onboard equipment of a vehicle in place of a first battery for supplying power to the onboard equipment, measures a temperature of the second battery, and determines whether or not the second battery is a suitable substitute for the first battery depending on whether or not the measured temperature is a preset set temperature or above.

11 Claims, 6 Drawing Sheets

BATTERY CONTROL DEVICE, VEHICLE, BATTERY CONTROL METHOD AND NON-TRANSITORY COMPUTER-READABLE RECORDING MEDIUM

CROSS-REFERENCE TO RELATED APPLICATION

This application is based on and claims priority under 35 USC 119 from Japanese Patent Application No. 2021-022782 filed on Feb. 16, 2021, the disclosure of which is incorporated by reference herein.

BACKGROUND

Technical Field

The present disclosure relates to a battery control device, a vehicle, a battery control method, and a non-transitory computer readable recording medium.

Related Art

Japanese Patent Application Laid-Open (JP-A) No. 2020-156228 discloses a vehicle battery control device that finds a minimum temperature at which a sub battery is able to secure the power required to provide back-up for a main battery based on a temperature of the sub battery, a state of charge (SOC), and a computed potential power output, and uses this to determine whether or not the sub battery is able to provide back-up.

In JP-A No. 2020-156228, when making the determination, the potential power output is estimated based on a battery resistance value. Note that a marked increase in resistance is typically seen in cases in which the battery has dropped from a normal temperature to a low temperature. Thus, when determining whether or not back-up is possible based on the estimated potential power output, there is likely to be a difference between the potential power output and guaranteed power, this being the minimum power level guaranteed by the battery at low temperatures, and it is therefore easy to ensure accurate determination. However, at high temperatures less of a difference arises between the potential power output and the guaranteed power configuring the minimum power level guaranteed by the battery, and so incorrect determination might be made.

SUMMARY

An aspect of the present disclosure is a battery control device that includes: a memory; and a processor coupled to the memory. The processor is configured to: compute a potential power output capable of being output by a second battery capable of supplying power to onboard equipment of a vehicle in place of a first battery for supplying power to the onboard equipment, measure a temperature of the second battery, and determine whether or not the second battery is a suitable substitute for the first battery depending on whether or not the measured temperature is a preset set temperature or above.

DETAILED DESCRIPTION

Detailed explanation follows regarding an example of an exemplary embodiment of the present disclosure, with reference to the drawings.

Overall Configuration

Figure 1:
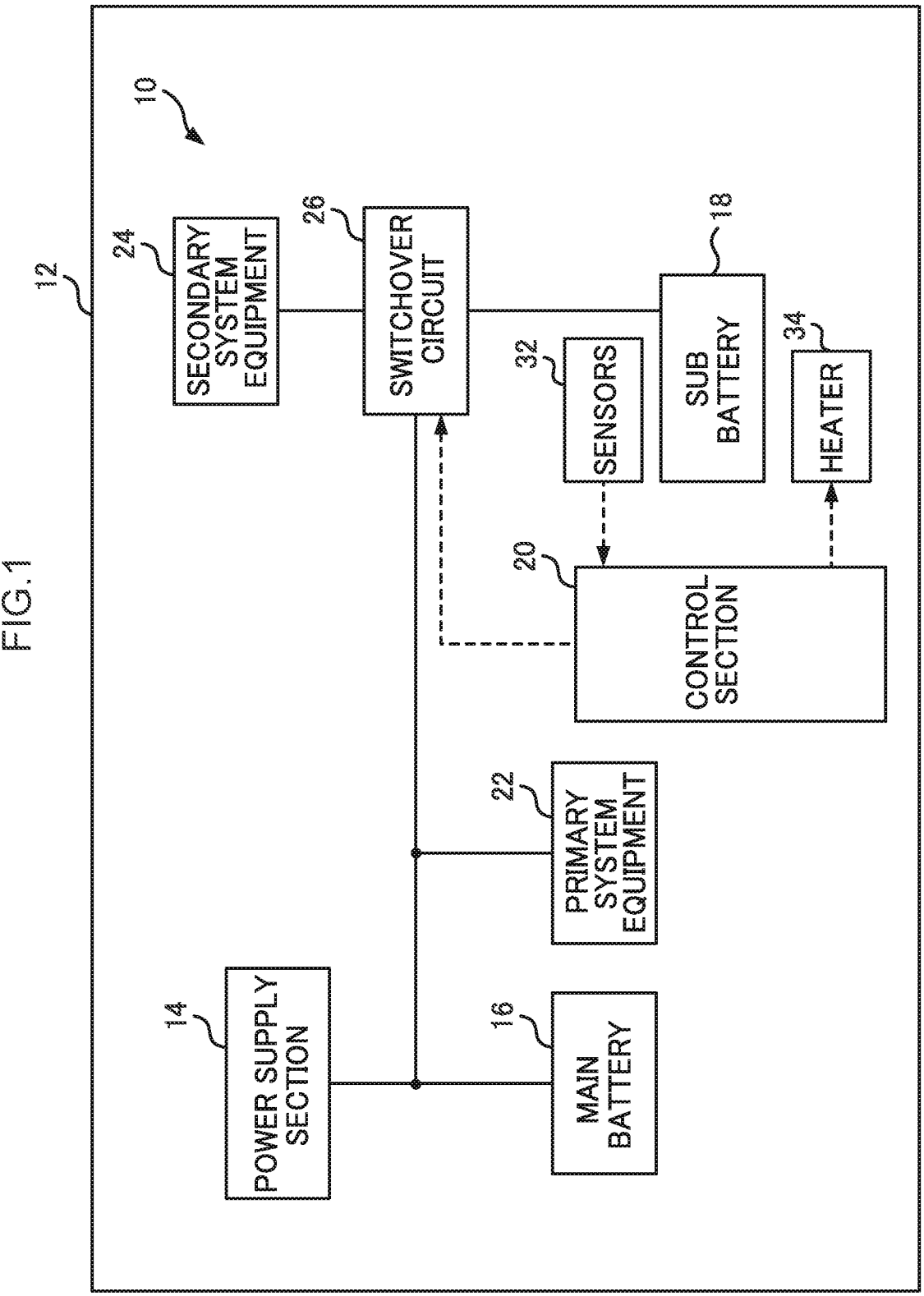
FIG. 1 is a diagram illustrating an example of a schematic configuration of a vehicle and a power source system.

FIG. 1 is a diagram illustrating a schematic configuration of a power source system 10 including a battery control device according to the present exemplary embodiment. As illustrated in FIG. 1, the power source system 10 of the present exemplary embodiment is installed in a vehicle 12 that is capable of switching between manual driving and autonomous driving. The power source system 10 includes a power supply section 14, a main battery 16, a sub battery 18, a control section 20 serving as a battery control device, primary system equipment 22, secondary system equipment 24, a switchover circuit 26, sensors 32, and a heater 34.

The power supply section 14, the main battery 16, and the primary system equipment 22 are electrically connected to the switchover circuit 26. The sub battery 18 and the secondary system equipment 24 are also electrically connected to the switchover circuit 26.

As an example, the power supply section 14 is configured by equipment capable of outputting predetermined power, such as an alternator or a DC-to-DC convertor. Power output from the power supply section 14 is supplied to the main battery 16 and the primary system equipment 22, and is also output to the switchover circuit 26.

The main battery 16 is a rechargeable battery that is capable of being charged with and discharging electricity, such as a lead-acid battery or a lithium-ion battery. The main battery 16 is an example of a first battery. The main battery 16 accumulates power output by the power supply section 14, and outputs this accumulated power to the primary system equipment 22 and the switchover circuit 26.

The sub battery 18 of the present exemplary embodiment is a lithium-ion battery. Note that the sub battery 18 is not limited to a lithium-ion battery as long as it is a rechargeable battery that is capable of being charged with and discharging electricity, for example a lead-acid battery. The sub battery 18 is an example of a second battery. The sub battery 18 accumulates power output from the power supply section 14 and power output from the main battery 16, and outputs this accumulated power to the secondary system equipment 24 and so on. Even if the main battery 16 fails while the vehicle 12 is driving autonomously, the sub battery 18 takes the place of the main battery 16 so as to maintain a supply of power to the secondary system equipment 24 implementing autonomous driving. Namely, the sub battery 18 is capable of providing back-up for the main battery 16, and is provided for the purpose of redundancy.

The control section 20 includes a function to control the switchover circuit 26 and a function to control the heater 34. The control section 20 will be described in detail later.

The primary system equipment 22 is known onboard equipment operated using power output from the power supply section 14 and power accumulated in the main battery 16.

The secondary system equipment 24 is known onboard equipment operated using power output from the power supply section 14, power accumulated in the main battery 16, and power accumulated in the sub battery 18. The secondary system equipment 24 includes onboard equipment required during autonomous driving. The secondary system equipment 24 operates using at least one out of power output from the power supply section 14 or power accumulated in the main battery 16 during manual driving, and also operates using power accumulated in the sub battery 18 during autonomous driving.

The switchover circuit 26 is a circuit that switches the power supply source for the secondary system equipment 24. The switchover circuit 26 is configured including a switching circuit that switches the power connection destination, and a DC-to-DC convertor that converts the voltage of power supplied from the power supply section 14 and the main battery 16.

The sensors 32 include plural sensors that are provided in close proximity to the sub battery 18 in order to monitor states of the sub battery 18. The sensors 32 include a voltage sensor that measures a terminal voltage of the sub battery 18, a current sensor that measures the current flowing into and out of the sub battery 18, a temperature sensor that measures the temperature of the sub battery 18, and so on. Signals from the respective sensors configuring the sensors 32 are acquired by the control section 20, thereby enabling the control section 20 to ascertain states of the sub battery 18.

The heater 34 is a device that is provided in close proximity to the sub battery 18 in order to warm the sub battery 18. For example, a heat exchanger that utilizes heat generated by the engine may be employed as the heater 34. The heater 34 is controlled by the control section 20.

Control Section

As an example, the control section 20 may be configured by an autonomous driving electronic control unit (ECU). The control section 20 controls the switchover circuit 26 based on vehicle information (an ignition ON/OFF state, a manual driving/autonomous driving state, and so on) acquired from the onboard equipment configuring the secondary system equipment 24.

In cases in which the vehicle 12 is in a manually driven state, the control section 20 supplies power output from the power supply section 14 and/or power accumulated in the main battery 16 to the secondary system equipment 24. In cases in which the vehicle 12 is in an autonomously driven state and a determination section 230, described later, has determined that the sub battery 18 is capable of providing back-up, the control section 20 enables power accumulated in the sub battery 18 to be supplied to the secondary system equipment 24.

The control section 20 also controls heating by the heater 34 based on the temperature of the sub battery 18 as acquired from the corresponding sensor 32.

Figure 2:
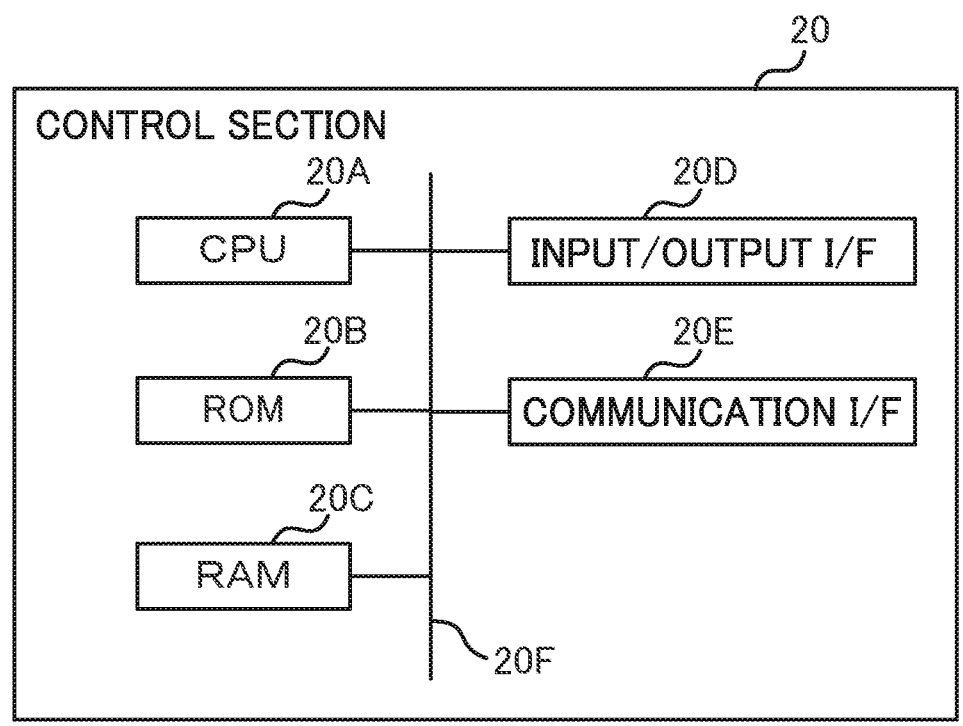
FIG. 2 is a block diagram illustrating an example of a hardware configuration of a control section.

As illustrated in FIG. 2, the control section 20 is configured including a central processing unit (CPU) 20A serving as an example of a hardware processor, read only memory (ROM) 20B corresponding to memory, random access memory (RAM) 20C, an input/output interface (I/F) 20D, and a communication I/F 20E. The CPU 20A, the ROM 20B, the RAM 20C, the input/output I/F 20D, and the communication I/F 20E are connected together so as to be capable of communicating with each other through an internal bus 20F.

The CPU 20A is a central processing unit that executes various programs and controls various sections. Namely, the CPU 20A reads a program from the ROM 20B and executes the program using the RAM 20C as a workspace.

Figure 3:
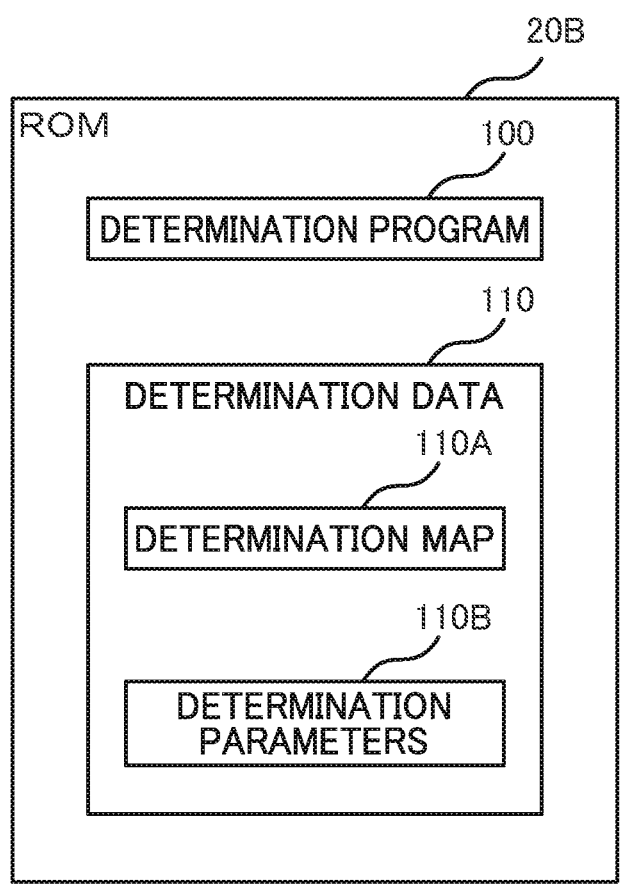
FIG. 3 is a block diagram illustrating an example of a configuration of ROM of a control section.

The ROM 20B serves as a storage section that stores various programs and various data. As illustrated in FIG. 3, a determination program 100 and determination data 110 are stored in the ROM 20B of the present exemplary embodiment.

The determination program 100 is a program for controlling the control section 20.

Data relating to a determination threshold, this being a threshold for determining whether or not the sub battery 18 is suitable as back-up for the main battery 16, is stored in the determination data 110. The determination data 110 further includes a determination map 110A and determination parameters 110B. The determination map 110A is data specifying a correspondence relationship between temperature of the sub battery 18 and guaranteed power, this being a minimum power level guaranteed by the sub battery 18 (see L1 in FIG. 6). This guaranteed power is found based on battery characteristics of the sub battery 18 when in a state of maximum deterioration while still within a guaranteed service life.

The determination parameters 110B are stored with a constant value obtained as a combined value of (1) demanded power required by the vehicle 12, (2) a power margin to allow for error of the sensors 32, (3) a power margin to allow for changes in environmental temperature, and (4) a power margin to allow for a fluctuation range of a state of charge (SOC). This constant value is set so as to be tailored to an actual usage environment of the vehicle 12. Additional explanation follows regarding the respective power values (1) to (4).

(1) The "demanded power required by the vehicle 12" refers to the bare minimum power required for travel of the vehicle 12. For example, in the event of an emergency arising during autonomous driving, this would be the power required for what is referred to as evacuation mode, in which the vehicle 12 is made to travel to a safe stopping place.

(2) The "power margin to allow for error of the sensors 32" refers to power computed based on a maximum error of the sensors, for example the voltage sensor and the current sensor. Note that error of the temperature sensor may be taken into consideration in addition to, or instead of, error of the voltage sensor and the current sensor.

(3) The "power margin to allow for changes in environmental temperature" refers to power computed based on an environmental temperature change amount. Note that the environmental temperature change amount is a temperature decrease amount that is possible in an actual usage environment, as determined based on information gathered from market sources. For example, in cases in which the battery is affected by the vehicle cabin interior temperature, the temperature decrease amount corresponds to the difference between a current temperature and a minimum temperature setting of an air conditioner.

(4) The "power margin to allow for a SOC fluctuation range" refers to power computed based on a SOC range that is possible from a control perspective. Here, the SOC fluctuation range is a range over which the SOC is controlled when carrying out charging and discharging in a battery system.

The RAM 20C acts as a workspace to temporarily store programs or data. The input/output I/F 20D is an interface for communicating with the switchover circuit 26, the sensors 32, and the heater 34.

The communication I/F 20E is an interface for connecting to other ECUs installed in the vehicle 12. For example, a CAN protocol is employed as the communication protocol for this interface. In cases in which the determination section 230, described later, has determined that the sub battery 18 is not suitable as back-up for the main battery 16, the control section 20 is able to output an anomaly notification through the communication I/F 20E.

Note that the control section 20 may include storage in addition to the ROM 20B, or instead of the ROM 20B. Such storage may be configured by a hard disk drive (HDD) or a solid state drive (SSD).

Figure 4:
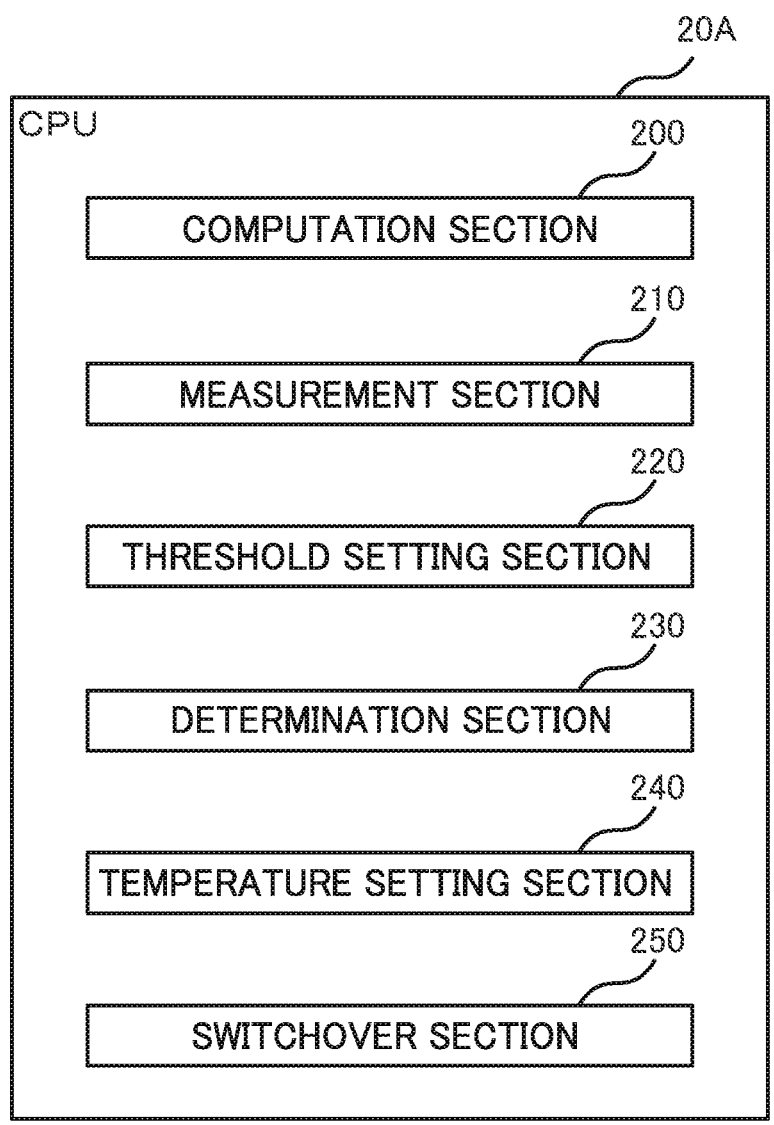
FIG. 4 is a block diagram illustrating an example of a functional configuration of a CPU of a control section.

As illustrated in FIG. 4, in the control section 20 of the present exemplary embodiment, by executing the determination program 100 the CPU 20A functions as a computation section 200, a measurement section 210, a threshold setting section 220, the determination section 230, a temperature setting section 240, and a switchover section 250.

The computation section 200 includes a function to compute a potential power output capable of being output by the sub battery 18. This potential power output may, for example, be computed using the method disclosed in JP-A No. 2020-156228, described previously. The computation section 200 of the present exemplary embodiment computes the potential power output from waveforms generated when the sub battery 18 is charging or discharging.

The measurement section 210 includes a function to measure the temperature of the sub battery 18. Specifically, the measurement section 210 measures the temperature based on information acquired from the temperature sensor of the sensors 32.

The threshold setting section 220 includes a function to set a determination threshold for determining whether or not the sub battery 18 is suitable as back-up for the main battery 16. In the present exemplary embodiment, the determination threshold is set differently on either side of a preset set temperature. Specifically, in cases in which the temperature of the sub battery 18 is below the set temperature, the threshold setting section 220 sets the determination threshold according to power values specified for respective temperatures in the determination map 110A. In cases in which the temperature of the sub battery 18 is the set temperature or above, the threshold setting section 220 sets the determination threshold to a fixed value specified in the determination parameters 110B. Note that the set temperature is preferably set to a temperature that enables a difference to the potential power output to be secured in cases in which the determination threshold is set according to the determination map 110A.

The determination section 230 includes a function to determine whether or not the sub battery 18 is suitable as back-up for the main battery 16. The determination section 230 of the present exemplary embodiment determines that the sub battery 18 is capable of providing back-up in cases in which the potential power output exceeds the determination threshold. As described above, the determination threshold is set based on different data depending on whether or not the temperature of the sub battery 18 is the set temperature or above. Namely, the determination section 230 performs determination by different methods depending on whether or not the temperature of the sub battery 18 is the set temperature or above. Note that during back-up determination processing, described later, in cases in which a power value from the determination map 110A has been set as the determination threshold, the determination section 230 repeatedly executes determination while raising the temperature on the determination map 110A (hereafter referred to as the "evaluation temperature") employed as a reference.

The temperature setting section 240 includes a function to set a heating start temperature in cases in which the external air temperature has dropped. In cases in which the temperature of the sub battery 18 is lower than the set temperature and the determination section 230 therefore repeatedly executes determination while raising the evaluation temperature, the temperature setting section 240 sets an evaluation temperature at which the potential power output exceeds the guaranteed power as the heating start temperature. Moreover, in cases in which the temperature of the sub battery 18 is the set temperature or above, the temperature setting section 240 sets a temperature obtained by subtracting a predetermined value from the current temperature of the sub battery 18 as the heating start temperature. This predetermined value is a temperature decrease amount that is possible in an actual usage environment, determined based on information gathered from market sources as described previously. In cases in which the battery is affected by the vehicle cabin interior temperature, the difference between the current temperature and the minimum temperature setting of the air conditioner may be set as the predetermined value.

The switchover section 250 includes a function to switch the power supply source for the secondary system equipment 24 from the main battery 16 to the sub battery 18. In cases in which the determination section 230 has determined that the sub battery 18 could act as a substitute for the main battery 16, the switchover section 250 of the present exemplary embodiment switches the power supply source for the secondary system equipment 24 from the main battery 16 to the sub battery 18.

Control Flow

Figure 5:
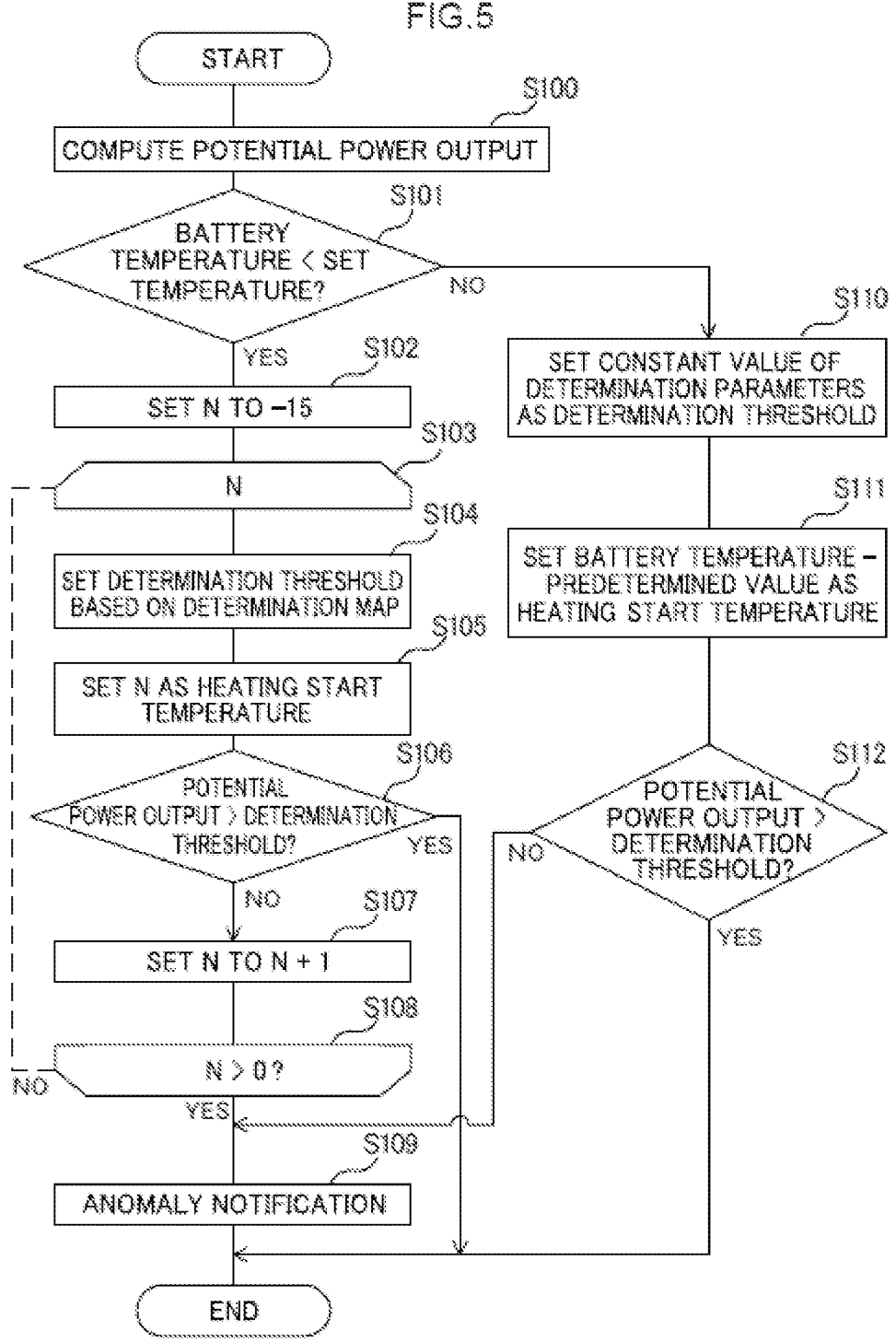
FIG. 5 is a flowchart illustrating an example of a flow of back-up determination processing.

Explanation follows regarding a flow of back-up determination processing as a battery control method of the present exemplary embodiment, executed by the control section 20, with reference to the flowchart in FIG. 5. The processing executed by the control section 20 is implemented by the CPU 20A functioning as the computation section 200, the measurement section 210, the threshold setting section 220, the determination section 230, the temperature setting section 240, and the switchover section 250 described above.

At step S100 in FIG. 5, the CPU 20A computes the potential power output of the sub battery 18. The computed potential power output is not limited to only the potential power output at the current temperature of the sub battery 18, and may also be computed for an estimated value of the potential power output at a predetermined temperature.

At step S101, the CPU 20A determines whether or not the temperature of the sub battery 18 is below the set temperature. In cases in which the CPU 20A determines that the temperature of the sub battery 18 is below the set temperature (in cases in which step S101 is YES), processing proceeds to step S102. On the other hand, in cases in which the CPU 20A determines that the temperature of the sub battery 18 is not below the set temperature, namely that the temperature of the sub battery 18 is the set temperature or above (in cases in which step S101 is NO), processing proceeds to step S110.

At step S102, the CPU 20A sets a variable N to a value of −15. This variable N is referenced as the evaluation temperature at step S104, described later.

Next, the processing of step S103 to step S108 is executed in a loop, based on the variable N.

At step S104, the CPU 20A sets the determination threshold based on the determination map 110A. The CPU 20A references the determination map 110A so as to set a power value corresponding to the evaluation temperature, namely the current variable N, as the determination threshold.

At step S105, the CPU 20A sets the variable N as the heating start temperature of the heater 34.

At step S106, the CPU 20A determines whether or not the potential power output of the sub battery 18 has exceeded the determination threshold. The CPU 20A makes this determination by comparing the potential power output at the evaluation temperature against the power value in the determination map 110A that has been set to the determination threshold. In cases in which the CPU 20A determines that the potential power output has exceeded the determination threshold (in cases in which step S106 is YES), the CPU 20A interrupts the loop processing and ends the back-up determination processing. In cases in which the CPU 20A determines that the potential power output has not exceeded the determination threshold, namely that the potential power output is the determination threshold or below (in cases in which step S106 is NO), processing proceeds to step S107.

At step S107, the CPU 20A increments the variable N by 1.

At step S108, the CPU 20A determines whether or not the variable N is greater than 0. In cases in which the CPU 20A determines that the variable N is greater than 0, the loop processing is ended. In cases in which the CPU 20A determines that the variable N is not greater than 0, namely that the variable N is 0 or less, processing returns to step S103, and the loop processing is continued.

At step S109, the CPU 20A makes an anomaly notification. Thus, the control section 20 serving as an autonomous driving ECU controls such that a switchover from manual driving to autonomous driving is not permitted. Moreover, by transmitting the anomaly notification to other ECUs such as a meter ECU, a driver of the vehicle 12 can be alerted of the fact that autonomous driving cannot be executed.

At step S110, the CPU 20A sets the constant value of the determination parameters 110B as the determination threshold.

At step S111, the CPU 20A sets a temperature obtained by subtracting a predetermined value from the current temperature of the sub battery 18 as the heating start temperature.

At step S112, the CPU 20A determines whether or not the potential power output of the sub battery 18 has exceeded the determination threshold. The CPU 20A makes this determination by comparing the potential power output at the current temperature of the sub battery 18 against the constant value of the determination parameters 110B that has been set as the determination threshold. In cases in which the CPU 20A determines that the potential power output has not exceeded the determination threshold, namely that the potential power output is the determination threshold or below (in cases in which step S112 is NO), processing proceeds to step S109. In cases in which the CPU 20A determines that the potential power output has exceeded the determination threshold (in cases in which step S112 is YES), the back-up determination processing is ended.

SUMMARY OF EXEMPLARY EMBODIMENT

In the control section 20 of the present exemplary embodiment, the computation section 200 computes the potential power output capable of being output by the sub battery 18, and the determination section 230 determines whether or not the sub battery 18 is suitable as back-up for the main battery 16.

Figure 6:
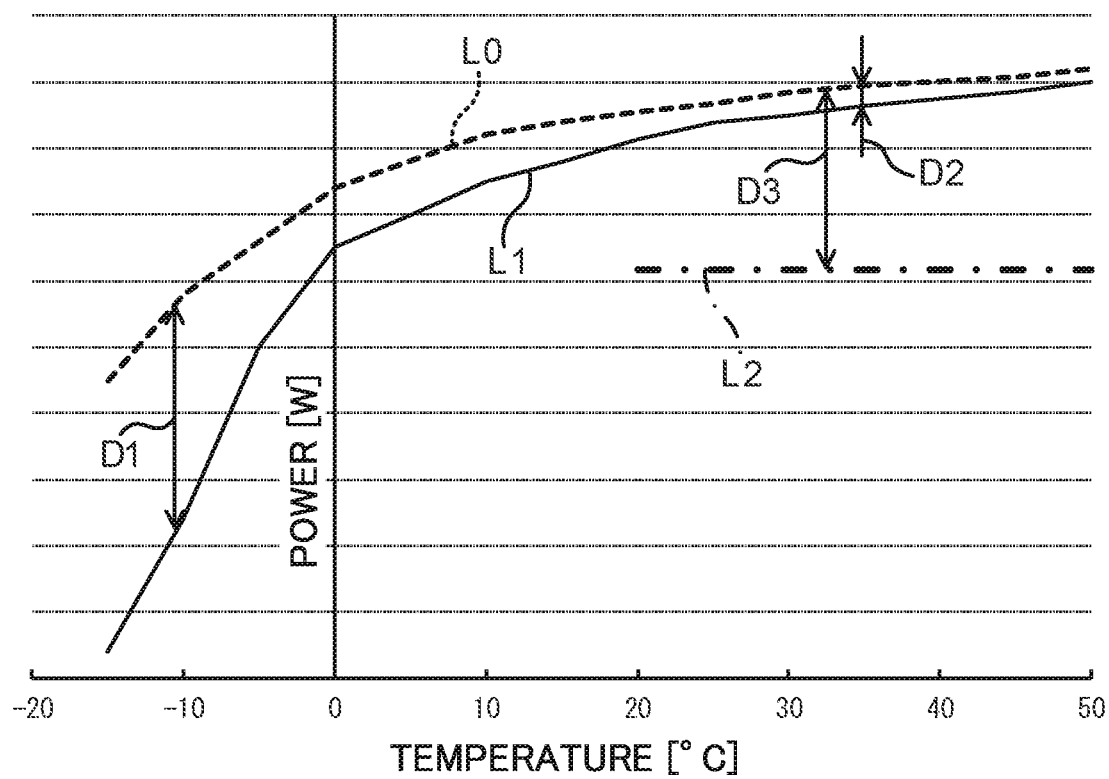
FIG. 6 is a diagram for explaining determination performed according to potential power output.

Additional explanation follows with reference to FIG. 6 regarding the determination as to whether or not back-up can be provided based on the computed potential power output. In FIG. 6, L0 is a line indicating potential power output against battery temperature, and L1 is a line indicating guaranteed power, this being the minimum guaranteed battery power from the sub battery 18. L2 is a line indicating the combined value of demanded power required by the vehicle 12, the power margin to allow for error of the sensors 32, the power margin to allow for changes in environmental temperature, and the power margin to allow for the SOC fluctuation range.

As indicated by L0 and L1, a marked increase in resistance is typically seen in cases in which the battery has dropped below a normal temperature (namely, a temperature corresponding to a normal usage environment), such that power decreases rapidly with falling temperature below the normal temperature. On the other hand, the change in power becomes less pronounced as the temperature increases above the normal temperature. Based on this tendency, when comparing the difference between L0, indicating the potential power output, and L1, indicating the guaranteed battery power, it can be seen that a difference D1 when the battery is at a low temperature is greater than a difference D2 when the battery is at a high temperature. Accordingly, determination accuracy is easier to ensure at low temperatures.

Thus, in the present exemplary embodiment, a temperature at which a certain degree of difference between L0, indicating the potential power output, and L1, indicating the guaranteed power of the battery, can be secured is employed as the set temperature, and the determination section 230 applies different methods when performing determination depending on whether or not the temperature of the sub battery 18 is the preset set temperature or above. In cases in which the temperature of the sub battery 18 is below the set temperature, the determination section 230 of the present exemplary embodiment performs determination using the guaranteed power corresponding to the temperature of the sub battery 18 as the determination threshold. This enables determination accuracy to be ensured at low temperatures.

On the other hand, in cases in which the battery is at a high temperature, the difference D2 between L0, indicating the potential power output, and L1, indicating the guaranteed power of the battery, is smaller than the difference D1 at a low temperature, and so a determination method in which the guaranteed power is used as the determination threshold might lead to an incorrect determination. Thus, the determination section 230 of the present exemplary embodiment performs determination using a threshold that considers the actual usage environment in cases in which the sub battery 18 is the set temperature or above. As an example, when L2 indicates power considering the actual usage environment, a difference D3 between L0, indicating the potential power output, and L2, indicating power considering the actual usage environment when the battery is at a high temperature, is greater than the difference D2 described above. This enables determination accuracy to be ensured at high temperatures.

In the present exemplary embodiment, employing different determination methods on either side of a preset set temperature enables determination accuracy to be ensured regardless of changes in temperature when determining whether or not the sub battery 18 is able to provide back-up for the main battery 16 based on the potential power output.

Moreover, in the present exemplary embodiment, when the sub battery 18 is the set temperature or above, determination is performed using a determination threshold that considers the actual usage environment. This determination threshold corresponds to the combined value of the demanded power required by the vehicle 12, the power margin to allow for error of the sensors 32, the power margin to allow for changes in environmental temperature, and the power margin to allow for the SOC fluctuation range. When performing determination as to whether or not the sub battery 18 is suitable as back-up for the main battery 16, as a minimum it would be sufficient to employ the demanded power required by the vehicle 12 as the determination threshold. However, in the present exemplary embodiment, the power margin to allow for error of the sensors 32, the power margin to allow for changes in environmental temperature, and the power margin to allow for the SOC fluctuation range are built into the determination threshold so as to provide a safety margin. This enables accuracy to be ensured when determination is made that the sub battery 18 is suitable as back-up for the main battery 16.

In the present exemplary embodiment, as illustrated by the processing loop from step S103 to step S108 in FIG. 5, the determination section 230 repeatedly executes determination while incrementing the variable N corresponding to the evaluation temperature. As the heating start temperature employed in cases in which the external air temperature has dropped, the temperature setting section 240 sets the evaluation temperature (namely the variable N) at which the potential power output exceeds the guaranteed power serving as the determination threshold (see step S105). In this manner, the present exemplary embodiment enables the temperature at which the sub battery 18 becomes suitable as back-up for the main battery 16 to be set. Namely, by controlling the heater 34 such that the temperature of the sub battery 18 does not drop below the heating start temperature, the sub battery 18 can be secured as a back-up power source.

The power source system 10 including the control section 20 of the present exemplary embodiment is installed in the vehicle 12. The vehicle 12 is configured such that the secondary system equipment 24 that includes onboard equipment used in autonomous driving receives a supply of power from either the main battery 16 or the sub battery 18. In the vehicle 12 of the present exemplary embodiment, in cases in which determination has been made that the sub battery 18 is suitable as back-up for the main battery 16, the switchover section 250 is able to switch the power supply source for the secondary system equipment 24 from the main battery 16 to the sub battery 18. The vehicle 12 of the present exemplary embodiment is thus capable of building redundancy into power sources of the vehicle during autonomous driving.

REMARKS

Note that the various processing executed by the CPU 20A reading and executing software (a program) in the above exemplary embodiment may be executed by various types of processor other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The respective processing of the foregoing description may be executed by any one of these various types of processor, or by a combination of two or more of the same type or different types of processor (such as plural FPGAs, or a combination of a CPU and an FPGA). The hardware structure of these various types of processors may be implemented by an electric circuit combining circuit elements such as semiconductor elements.

In the above exemplary embodiment, each of the programs is in a format pre-stored (installed) in a computer-readable non-transitory recording medium. For example, the determination program 100 of the control section 20 is pre-stored in the ROM 20B. However, there is no limitation thereto, and each of the programs may be provided in a format recorded on a non-transitory recording medium such as compact disc read only memory (CD-ROM), digital versatile disc read only memory (DVD-ROM), or universal serial bus (USB) memory. Alternatively, each of the programs may be provided in a format downloadable from an external device through a network.

The flow of processing explained in the above exemplary embodiment is merely an example, and superfluous steps may be omitted, new steps may be added, or the processing sequence may be changed within a range not departing from the spirit of the present disclosure.

An object of the present disclosure is to provide a battery control device, a vehicle, and a battery control method that ensure an accurate determination regardless of changes in temperature when determining whether or not a battery is able to provide back-up for another battery based on a potential power output.

A first aspect is a battery control device that includes: a memory; and a processor coupled to the memory. The processor is configured to: compute a potential power output capable of being output by a second battery capable of supplying power to onboard equipment of a vehicle in place of a first battery for supplying power to the onboard equipment, measure a temperature of the second battery, and determine whether or not the second battery is a suitable substitute for the first battery depending on whether or not the measured temperature is a preset set temperature or above.

The battery control device of the first aspect computes the potential power output capable of being output by the second battery. The second battery is a battery capable of supplying power to the onboard equipment of the vehicle in place of the first battery. The battery control device further determines whether or not the second battery is a suitable substitute for the first battery. The battery control device performs this determination employing different methods depending on whether or not the measured temperature is the preset set temperature or above. By changing the determination methods based on the preset set temperature, the battery control device enables determination accuracy to be ensured regardless of changes in temperature when making determination as to whether or not a battery is able to provide back-up for another battery based on a potential power output.

A second aspect is the battery control device of the first aspect, wherein the processor is configured to: set a demanded power required by the vehicle as a threshold; and in a case in which the measured temperature is the set temperature or above, and in a case in which the potential power output exceeds the threshold, determine that the second battery is a suitable substitute for the first battery.

The battery control device of the second aspect sets the demanded power required by the vehicle as the threshold, and in cases in which the measured temperature is the set temperature or above, determines the second battery to be a suitable substitute for the first battery in cases in which the potential power output exceeds the threshold. This battery control device performs determination based on a threshold that considers the actual usage environment in cases in which the temperature of the battery is the set temperature or above, thereby enabling determination accuracy to be ensured at high temperatures.

A third aspect is the battery control device of the second aspect, wherein the processor is configured to add a power based on a sensor error to the threshold.

The battery control device of the third aspect applies stricter determination conditions by adding to the threshold the power margin to allow for sensor error, thereby enabling accuracy to be ensured when the second battery is determined as a substitute for the first battery.

A fourth aspect is the battery control device of the second or the third aspect, wherein the processor is configured to add a power based on changes in environmental temperature to the threshold.

The battery control device of the fourth aspect applies stricter determination conditions by adding to the threshold the power margin to allow for changes in environmental temperature, thereby enabling accuracy to be ensured when the second battery is determined as a substitute for the first battery.

A fifth aspect is the battery control device of any of the second to the fourth aspects, wherein the processor is configured to add a power based on a fluctuation range of a state of charge to the threshold.

The battery control device of the fifth aspect applies stricter determination conditions by adding to the threshold the power margin to allow for the fluctuation range of the state of charge, thereby enabling accuracy to be ensured when the second battery is determined as a substitute for the first battery.

A sixth aspect is the battery control device of any of the first to the fifth aspects, wherein: the memory is configured to store a correspondence relationship between the temperature of the second battery and a guaranteed power guaranteed as a minimum by the second battery; and in a case in which the measured temperature is below the set temperature, and in a case in which the potential power output exceeds the guaranteed power at an evaluation temperature, the processor is configured to determine that the second battery is a suitable substitute for the first battery.

In cases in which the measured temperature is below the set temperature, the battery control device of the sixth aspect determines the second battery to be a suitable substitute for the first battery in cases in which the potential power output exceeds the guaranteed power at an evaluation temperature. This battery control device performs determination based on the guaranteed power corresponding to the battery temperature in cases in which the battery temperature is below the set temperature, thereby enabling determination accuracy to be ensured at low temperatures.

A seventh aspect is the battery control device of the sixth aspect, wherein, in a case in which the processor is configured to repeatedly execute determination while raising the evaluation temperature, the processor is configured to set the evaluation temperature at which the potential power output exceeds the guaranteed power to a heating start temperature in a case in which an external air temperature has dropped.

The battery control device of the seventh aspect repeatedly executes determination while raising the evaluation temperature, and sets the evaluation temperature at which the potential power output exceeds the guaranteed power to the heating start temperature employed in cases in which the external air temperature has dropped. The battery control device is thus capable of setting a temperature at which the second battery becomes a suitable substitute for the first battery.

An eighth aspect is a vehicle that includes: the battery control device of any of the first to the seventh aspects; the onboard equipment including equipment for autonomous driving; the first battery; and the second battery, wherein, in a case in which the processor has determined the second battery to be a suitable substitute for the first battery, the processor is configured to switch a power supply source of the onboard equipment from the first battery to the second battery.

The vehicle of the eighth aspect is configured such that the onboard equipment for performing autonomous driving receives a supply of power from either the first battery or the second battery. The vehicle is capable of switching the power supply source of the onboard equipment from the first battery to the second battery in cases in which the second battery has been determined to be a suitable substitute for the first battery. The vehicle is thus capable of building redundancy into power sources of the vehicle during autonomous driving.

A ninth aspect is a battery control method that includes: by a processor, computing a potential power output capable of being output by a second battery capable of supplying power to onboard equipment of a vehicle in place of a first battery for supplying power to the onboard equipment; measuring a temperature of the second battery, and determining whether or not the second battery is a suitable substitute for the first battery depending on whether or not the measured temperature is a preset set temperature or above.

In the battery control method of the ninth aspect, a computer computes the potential power output capable of being output by the second battery. The second battery is configured as described above. In this battery control method, the computer determines whether or not the second battery is a suitable substitute for the first battery employing different methods depending on whether or not the measured temperature is the preset set temperature or above. By changing the determination methods based on the preset set temperature, the battery control method enables determination accuracy to be ensured regardless of changes in temperature when making determination as to whether or not a battery is able to provide back-up for another battery based on a potential power output.

The first aspect to the ninth aspect may be implemented by a non-transitory computer-readable recording medium recorded with a determination program.

The present disclosure enables accurate determination to be ensured regardless of changes in temperature when determining whether or not a battery is able to provide back-up for another battery based on a potential power output.

The invention claimed is:

1. A battery control device comprising:
a memory; and
a processor coupled to the memory, the processor being configured to:
compute a potential power output capable of being output by a second battery capable of supplying power to onboard equipment of a vehicle in place of a first battery for supplying power to the onboard equipment,
measure a temperature of the second battery, wherein the memory is configured to store a correspondence relationship between the temperature of the second battery and a guaranteed power guaranteed as a minimum by the second battery, determine whether or not the second battery is a suitable substitute for the first battery depending on whether or not the measured temperature is a set temperature or above, in response to the measured temperature being below the set temperature, and the potential power output exceeding the guaranteed power at an evaluation temperature, determine that the second battery is a suitable substitute for the first battery, and in response to determining that the second battery is a suitable substitute for the first battery, switch a power supply source of the onboard equipment from the first battery to the second battery.

2. The battery control device of claim 1, wherein the processor is configured to:

set a demanded power required by the vehicle as a threshold; and in a case in which the measured temperature is the set temperature or above, and in a case in which the potential power output exceeds the threshold, determine that the second battery is a suitable substitute for the first battery.

3. The battery control device of claim 2, wherein the processor is configured to add a power based on a sensor error to the threshold.

4. The battery control device of claim 2, wherein the processor is configured to add a power based on changes in environmental temperature to the threshold.

5. The battery control device of claim 2, wherein the processor is configured to add a power based on a fluctuation range of a state of charge to the threshold.

6. The battery control device of claim 1, wherein, in a case in which the processor is configured to repeatedly execute determination while raising the evaluation temperature, the processor is configured to set the evaluation temperature at which the potential power output exceeds the guaranteed power to a heating start temperature in a case in which an external air temperature has dropped.

7. A vehicle comprising:

the battery control device of claim 1;

the onboard equipment including equipment for autonomous driving;

the first battery; and the second battery.

8. A battery control method, comprising:

by a processor, computing a potential power output capable of being output by a second battery capable of supplying power to onboard equipment of a vehicle in place of a first battery for supplying power to the onboard equipment;

measuring a temperature of the second battery, storing, in a memory, a correspondence relationship between the temperature of the second battery and a guaranteed power guaranteed as a minimum by the second battery, determining whether or not the second battery is a suitable substitute for the first battery depending on whether or not the measured temperature is a set temperature or above, in response to the measured temperature being below the set temperature, and the potential power output exceeding the guaranteed power at an evaluation temperature, determining that the second battery is a suitable substitute for the first battery, and in response to determining that the second battery is a suitable substitute for the first battery, switching a power supply source of the onboard equipment from the first battery to the second battery.

9. The battery control method of claim 8, further comprising:

setting a demanded power required by the vehicle as a threshold; and in a case in which the measured temperature is the set temperature or above, and in a case in which the potential power output exceeds the threshold, determining that the second battery is a suitable substitute for the first battery.

10. A non-transitory computer-readable recording medium recording a determination program executable by a computer to perform processing, the processing comprising:

computing a potential power output capable of being output by a second battery capable of supplying power to onboard equipment of a vehicle in place of a first battery for supplying power to the onboard equipment, measuring a temperature of the second battery, storing, in a memory, a correspondence relationship between the temperature of the second battery and a guaranteed power guaranteed as a minimum by the second battery, determining whether or not the second battery is a suitable substitute for the first battery depending on whether or not the measured temperature is a set temperature or above, in response to the measured temperature being below the set temperature, and the potential power output exceeding the guaranteed power at an evaluation temperature, determining that the second battery is a suitable substitute for the first battery, and in response to determining that the second battery is a suitable substitute for the first battery, switching a power supply source of the onboard equipment from the first battery to the second battery.

11. The non-transitory computer-readable recording medium of claim 10, wherein the processing further comprising:

setting a demanded power required by the vehicle as a threshold; and in a case in which the measured temperature is the set temperature or above, and in a case in which the potential power output exceeds the threshold, determining that the second battery is a suitable substitute for the first battery.

* * * * *